(12) United States Patent
Kim et al.

(10) Patent No.: US 9,400,577 B2
(45) Date of Patent: Jul. 26, 2016

(54) CAPACTIVE TOUCH PANEL

(75) Inventors: Byung Soo Kim, Seoul (KR); Keun Sik Lee, Seoul (KR); Chung Won Seo, Seoul (KR); Ji Won Jo, Seoul (KR); Hyuk Jin Hong, Seoul (KR); Yong In Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 46 days.

(21) Appl. No.: 13/501,951

(22) PCT Filed: Oct. 15, 2010

(86) PCT No.: PCT/KR2010/007087
§ 371 (c)(1),
(2), (4) Date: Apr. 13, 2012

(87) PCT Pub. No.: WO2011/046389
PCT Pub. Date: Apr. 21, 2011

(65) Prior Publication Data
US 2012/0199464 A1    Aug. 9, 2012

(30) Foreign Application Priority Data
Oct. 15, 2009    (KR) .................. 10-2009-0098438

(51) Int. Cl.
*H03K 17/975*    (2006.01)
*G06F 3/044*    (2006.01)
*G06F 3/047*    (2006.01)

(52) U.S. Cl.
CPC .............. *G06F 3/044* (2013.01); *G06F 3/047* (2013.01); *Y10T 29/49105* (2015.01)

(58) Field of Classification Search
CPC ...................... H03K 17/962; H03K 17/975

USPC .......................... 200/600; 345/173
See application file for complete search history.

(56) References Cited

U.S. PATENT DOCUMENTS 5,062,916 A * 11/1991 Aufderheide et al. ........ 156/269
6,970,160 B2 * 11/2005 Mulligan et al. .............. 345/173
(Continued)

FOREIGN PATENT DOCUMENTS

| CN | 15-67360 A | 1/2005 |
|---|---|---|
| CN | 101135797 A | 3/2008 |

(Continued)

OTHER PUBLICATIONS

Office Action dated Aug. 30, 2013 in Taiwanese Application No. 099135279, filed Oct. 15, 2010.
(Continued)

*Primary Examiner* — Vanessa Girardi
(74) *Attorney, Agent, or Firm* — Saliwanchik, Lloyd & Eisenschenk

(57) ABSTRACT

A touch panel is provided. The touch panel includes a first conductive pattern, a first insulation layer, a second conductive pattern, a first metal electrode, a second metal electrode, and a second insulation layer. The first conductive pattern is formed on a transparent substrate. The first insulation layer is formed on the first conductive pattern. The second conductive pattern is formed on the first insulation layer. The first metal electrode is connected to one end of the first conductive pattern. The second metal electrode is connected to one end of the second conductive pattern. The second insulation layer is formed on the second conductive pattern, the first metal electrode or the second metal electrode.

9 Claims, 7 Drawing Sheets

(56) References Cited

U.S. PATENT DOCUMENTS

| | | | |
|---|---|---|---|
| 7,439,962 B2* | 10/2008 | Reynolds et al. | 345/173 |
| 8,149,207 B2* | 4/2012 | Lai | 345/104 |
| 8,330,738 B2 | 12/2012 | Hung et al. | |
| 8,681,107 B2* | 3/2014 | Jeong et al. | 345/173 |
| 2003/0052867 A1 | 3/2003 | Shigetaka et al. | |
| 2007/0062739 A1 | 3/2007 | Philipp et al. | |
| 2007/0242054 A1 | 10/2007 | Chang et al. | |
| 2008/0252614 A1* | 10/2008 | Tatehata et al. | 345/174 |
| 2008/0259044 A1 | 10/2008 | Utsunomiya et al. | |
| 2009/0084613 A1* | 4/2009 | Yang et al. | 178/18.06 |
| 2009/0085885 A1 | 4/2009 | Wu et al. | |
| 2009/0085891 A1* | 4/2009 | Yang et al. | 345/174 |
| 2009/0160824 A1 | 6/2009 | Chih-Yung et al. | |
| 2009/0255737 A1* | 10/2009 | Chang et al. | 178/18.06 |
| 2010/0214247 A1* | 8/2010 | Tang et al. | 345/173 |
| 2011/0012842 A1 | 1/2011 | Lee et al. | |
| 2013/0127741 A1* | 5/2013 | Kao et al. | 345/173 |

FOREIGN PATENT DOCUMENTS

| | | |
|---|---|---|
| CN | 201117002 Y | 9/2008 |
| CN | 101286106 A | 10/2008 |
| CN | 101299175 A | 11/2008 |
| CN | 2012-10288 Y | 3/2009 |
| CN | 10-1533319 A | 9/2009 |
| JP | 58-211244 A | 12/1983 |
| JP | 61-176638 U | 11/1986 |
| JP | 2003099185 A | 4/2003 |
| JP | 2008-134975 A | 6/2008 |
| JP | 2008-310551 A | 12/2008 |
| JP | 2009-123106 A | 6/2009 |
| JP | 2010061425 A | 3/2010 |
| JP | 2011-504618 A | 2/2011 |
| JP | 2011-076386 A | 4/2011 |
| KR | 10-0893499 B1 | 4/2009 |
| KR | 10-0909873 B1 | 7/2009 |
| TW | M344544 U | 11/2008 |
| TW | 200915151 A | 4/2009 |
| TW | 200928930 A | 7/2009 |
| TW | M364912 U | 9/2009 |

OTHER PUBLICATIONS

International Search Report in International Application No. PCT/KR2010/007087, filed Oct. 15, 2010.
Office Action dated Jul. 30, 2013 in Japanese Application No. 2012-534117, filed Oct. 15, 2010.
Office Action dated May 7, 2014 in Japanese Application No. 2012-534117.
Office Action dated Jun. 26, 2014 in Chinese Application No. 201080057314.5.
Office Action dated Sep. 1, 2015 in Japanese Application No. 2014-161228.
Office Action dated Oct. 21, 2015 in Chinese Application No. 201080057314.5.
Office Action dated Apr. 5, 2016 in Japanese Application No. 2014-161228.
Office Action dated May 17, 2016 in Chinese Application No. 201080057314.5.

* cited by examiner

CAPACITIVE TOUCH PANEL

CROSS-REFERENCE TO RELATED APPLICATIONS

This application is the U.S. national stage application of International Patent Application No. PCT/KR2010/007087, filed Oct. 15, 2010, which claims priority to Korean Application No. 10-2009-0098438, filed Oct. 15, 2009, the disclosures of each of which are incorporated herein by reference in their entirety.

TECHNICAL FIELD

The present disclosure relates to a touch panel and a manufacturing method thereof.

BACKGROUND ART

FIG. 1 is a perspective view illustrating a related art capacitive touch panel.

Referring to FIG. 1, a related art capacitive touch panel includes a lower plate 110, a first conductive pattern 140, a first metal electrode 150, an Optically Clear Adhesive (OCA) 120, an upper plate 130, a second conductive pattern 160, and a second metal electrode 170. In more detail, the first conductive pattern 140 is formed on the lower plate 110, and the first metal electrode 150 connected to the first conductive pattern 140 is formed on the lower plate 110. Herein, as illustrated in FIG. 1, a plurality of conductive pattern shapes are connected in one row in the abscissa axis direction and thereby the first conductive pattern 140 is formed. Also, straight-line pattern shapes are spaced apart. Moreover, the second conductive pattern 160 is formed on the upper plate 130, and the second metal electrode 170 connected to the second conductive pattern 160 is formed on the upper plate 130. Herein, the second conductive pattern 160 is vertical to the first conductive pattern 140. Also, the upper plate 130 and the lower plate 110 adhere to each other by the OCA 120.

In the related art touch panel, the first conductive pattern 140 and the first metal electrode 150 are formed on the lower plate 110, and the second conductive pattern 160 and the second metal electrode 170 are formed on the upper plate 130. That is, the first and second conductive patterns 140 and 160 are formed on different layers, and the first and second metal electrodes 150 and 170 are formed on different layers. However, a structure, in which the upper plate 130 and the lower plate 110 are divided and the OCA 120 is used between the upper plate 130 and the lower plate 110, has limitations.

That is, since the residual having viscosity occurs by using the OCA, efficiency of work decreases and the second failure increases. Moreover, transmittance and visibility decrease due to use of the OCA. Furthermore, there are limitations in reducing the entire thickness of a touch screen panel.

DISCLOSURE OF INVENTION

Technical Problem

Embodiments provide a touch panel and a manufacturing method thereof, which improve the transmittance and visibility of a thin film without using an Optically Clear Adhesive (OCA).

Solution to Problem

In one embodiment, a touch panel includes: a first conductive pattern on a transparent substrate; a first insulation layer on the first conductive pattern; a second conductive pattern on the first insulation layer; a first metal electrode connected to one end of the first conductive pattern; a second metal electrode connected to one end of the second conductive pattern; and a second insulation layer on the second conductive pattern, the first metal electrode or the second metal electrode.

One of the first and second metal electrodes may be formed outside the first insulation layer.

The first and second metal electrodes may be formed on the same plane.

The first metal electrode may be formed on the transparent substrate, and the second metal electrode may be formed on the first insulation layer.

The first and second conductive patterns may include the same materials as materials of the first and second metal electrodes, respectively.

The first and second conductive patterns may be extended in a mutually intersecting direction.

In another embodiment, a method of manufacturing touch panel includes: forming a first conductive pattern on a transparent substrate; forming a first insulation layer on the first conductive pattern; forming a second conductive pattern on the first insulation layer; forming a first metal electrode connected to one end of the first conductive pattern and a second metal electrode connected to one end of the second conductive pattern; and forming a second insulation layer on the second conductive pattern, the first metal electrode and the second metal electrode.

In the forming of a first metal electrode and a second metal electrode, the first and second metal electrodes may be simultaneously formed.

In further another embodiment, a method of manufacturing touch panel include: forming a first conductive pattern on a transparent substrate, and a first metal electrode connected to one end of the first conductive pattern; forming a first insulation layer on the first conductive pattern; forming a second conductive pattern on the first insulation layer, and a second metal electrode connected to one end of the second conductive pattern; and forming a second insulation layer on the second conductive pattern and the second metal electrode.

The forming of a first conductive pattern and a first metal electrode may sequentially perform an operation of forming the first conductive pattern, and an operation of forming the first metal electrode connected to the first conductive pattern.

The forming of a second conductive pattern and a second metal electrode may sequentially perform an operation of forming the second conductive pattern, and an operation of forming the second metal electrode connected to the second conductive pattern.

The details of one or more embodiments are set forth in the accompanying drawings and the description below. Other features will be apparent from the description and drawings, and from the claims.

ADVANTAGEOUS EFFECTS OF INVENTION

According to an embodiment, a thickness of a touch panel can decrease and the residual due to an Optically Clear Adhesive (OCA) can be prevented because the OCA is not used. In addition, the transmittance and visibility can be improved.

BEST MODE FOR CARRYING OUT THE INVENTION

Reference will now be made in detail to the embodiments of the present disclosure, examples of which are illustrated in the accompanying drawings.

In description of embodiments, it will be understood that in a case where a layer (or film), a region, a pattern, or components is referred to as being 'on' or 'under' another substrate, layer (or film), region or patterns, the 'on' and 'under' include all the meanings of 'directly' and 'indirectly'. Moreover, any reference of the 'on' or 'under' of each layer will be described with reference to the accompanying drawings.

In the accompanying drawings, the thickness or size of each layer (or film), region, pattern or structure may be modified for clarity and convenience and thus does not entirely reflect an actual size thereof.

Moreover, in specification, the meanings of the width and length do not define absolute directions but denote relatively vertical directions. For example, a structure in which a width pattern is formed on a length pattern is the same as a structure in which the length pattern is formed on the width pattern when viewed from different perspectives.

Hereinafter, embodiments will be described in detail with reference to the accompanying drawings.

Figure 1:
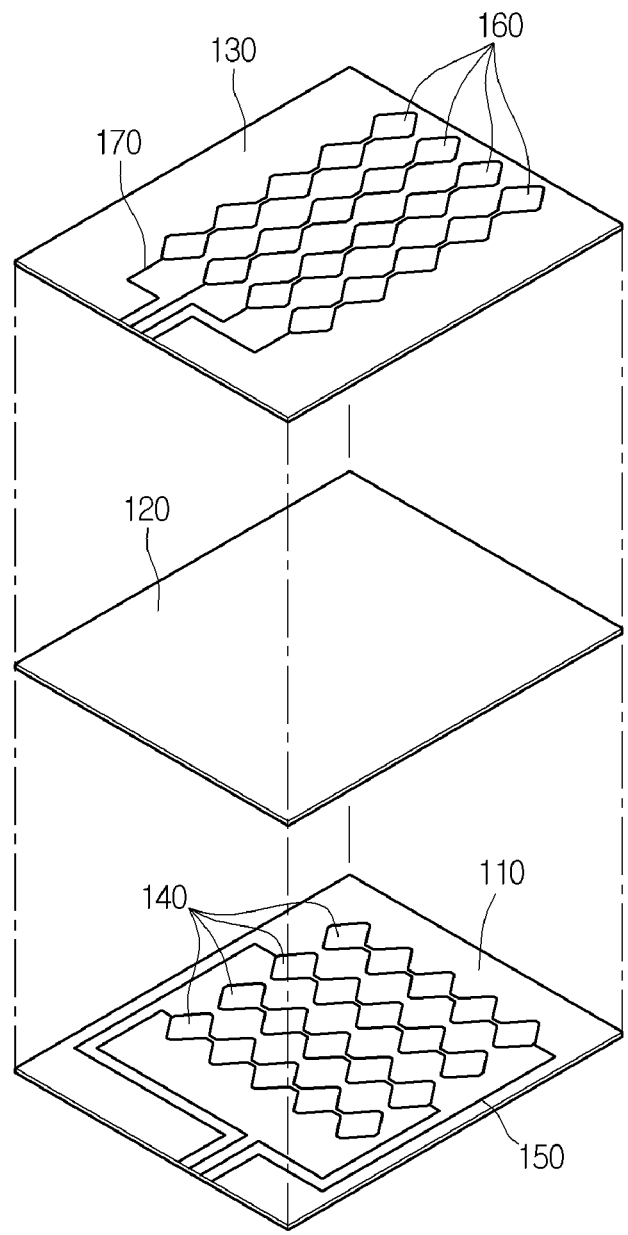
FIG. 1 is a perspective view illustrating a related art capacitive touch panel.
Figure 2:
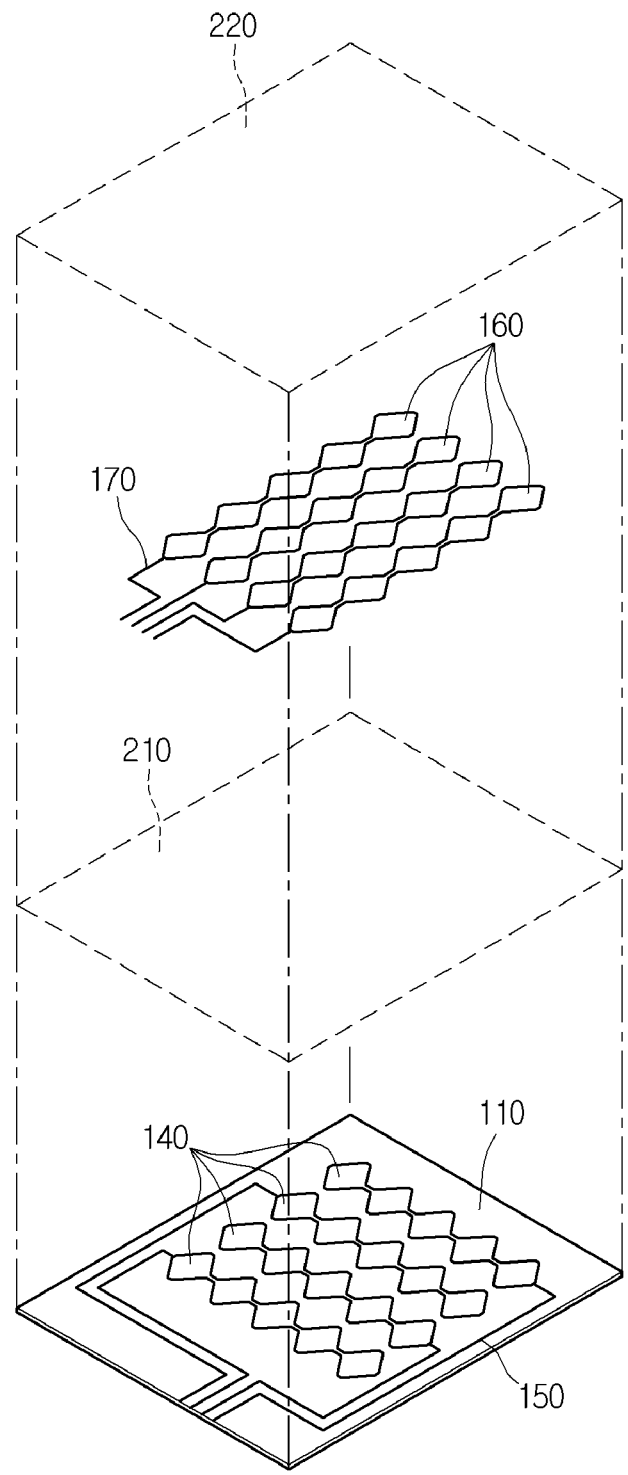
FIG. 2 is a perspective view illustrating a touch panel according to an embodiment.

FIG. 2 is a perspective view illustrating a touch panel according to an embodiment.

Referring to FIG. 2, a touch panel according to an embodiment includes a transparent substrate 110, a first conductive pattern 140, a second conductive pattern 160, a first metal electrode 150, a second metal electrode 170, a first insulation layer 210, and a second insulation layer 220. In more detail, one or more first conductive patterns 140, in which a plurality of conductive transparent patterns are connected in one row with respect to the abscissa axis of the transparent substrate 110, are formed spaced apart on the transparent substrate 110. Herein, the transparent pattern may be Indium Tin Oxide (ITO). Also, as illustrated, the shape of each of the transparent patterns may have corners that are connected in a diamond shape, but it is not limited thereto. As another example, the each transparent pattern may have an appropriate shape such as a triangle or a pentagonal shape, according to a manufacturer's requirements.

Moreover, the first metal electrode 150 connected to the one end of the each first conductive pattern 140 is formed. Herein, the materials of the first conductive pattern 140 and first metal electrode 150 may be the same.

The first insulation layer 210 is formed on the first conductive pattern 140. Herein, by appropriately selecting an organic material or an inorganic material as the material of the first insulation layer 210, transmittance may be controlled.

One or more second conductive patterns 160, in which a plurality of conductive transparent patterns are connected in one row with respect to the ordinate axis of the transparent substrate 110, are formed spaced apart on the first insulation layer 210. Herein, the material and shape of the transparent pattern are the same as the material and shape that have described above in the first conductive pattern 140. The second conductive pattern 160 is disposed to face the spaced portion of the first conductive pattern 140. That is, when seen from an upper portion, the first and second conductive patterns 140 and 160 are disposed not to overlap with each other. Moreover, the second metal electrode 170 connected to the one end of each of the second conductive patterns 160 is formed. Herein, the materials of the second pattern 160 and second metal electrode 170 may be the same.

The second insulation layer 220 is formed to cover the elements that are formed on the transparent substrate 110.

As a result, the touch panel according to an embodiment does not use an Optically Clear Adhesive (OCA), and thus decreases an entire panel thickness and prevents OCA residual from occurring, thereby improving the manufacturing cost and efficiency of the touch panel.

Figure 3:
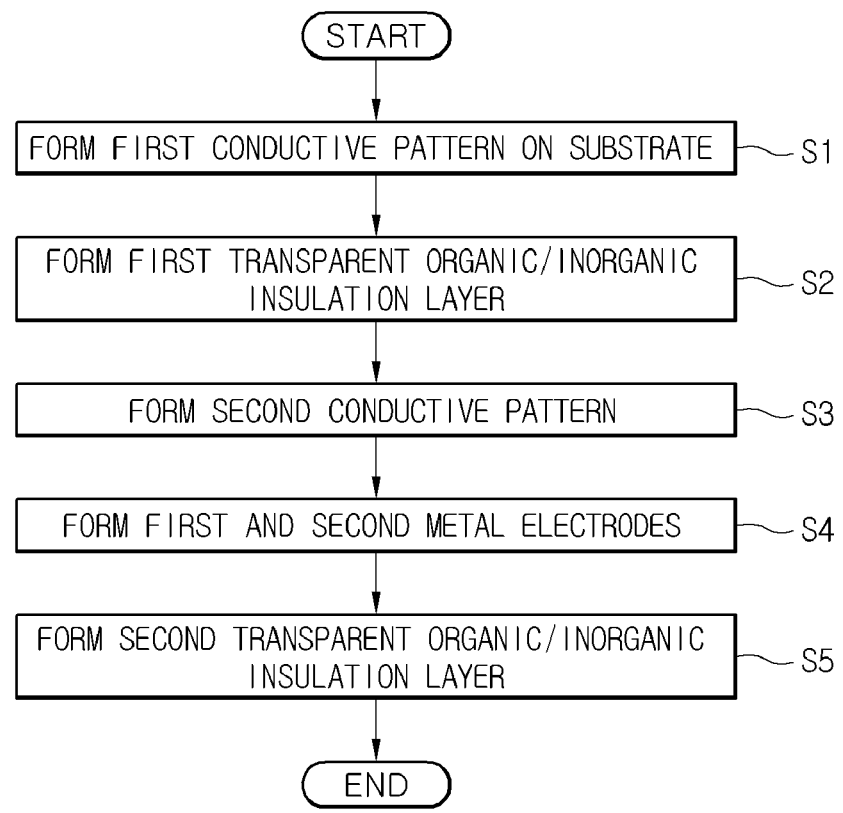
FIG. 3 is a flowchart illustrating a method of manufacturing touch panel according to an embodiment.

FIG. 3 is a flowchart illustrating a method of manufacturing touch panel according to an embodiment.

Referring to FIG. 3, first, a first conductive pattern is formed in operation S1. In more detail, a transparent substrate is prepared. Herein, the transparent substrate may use various transparent materials such as organic and plastic. A conductive transparent layer is coated, and a resist corresponding to the first conductive pattern is coated. Subsequently, by performing an etching process, the conductive transparent layer of a portion where the resist is not formed is etched, the resist is removed, and thus the first conductive pattern is formed.

Subsequently, a first insulation layer is formed in operation S2. Herein, the first insulation layer is formed to cover a portion where the first conductive pattern is formed. Afterward, a second conductive pattern is formed in operation S3. In more detail, a resist corresponding to the second conductive pattern is coated. Subsequently, by performing an etching process, the conductive transparent layer of a portion where the resist is not formed is etched, the resist is removed, and thus the second conductive pattern is formed. First and second metal electrodes are formed in operation S4. Herein, the first and second metal electrodes are formed to be connected to the first and second conductive patterns, respectively.

Operations S3 and S4 may be performed at the same time. That is, a metal corresponding to the shape of the second conductive pattern and the shapes of the first and second metal electrodes is coated, a resist is coated, and after performing an etching process, by removing the resist, the second conductive pattern and the first and second metal electrodes may be simultaneously formed of the same material.

More specifically, a metal is coated on a transparent substrate where the first insulation layer is not formed, a resist having a shape corresponding to the first and second metal electrodes is coated, and then, by performing an etching process, the conductive metal of a portion where the resist is not formed is etched, the resist is removed, and thus the first and second metal electrodes are formed. Finally, a second insulation layer covering the first metal electrode, the second metal electrode and the second conductive pattern is formed in operation S5.

Figure 4:
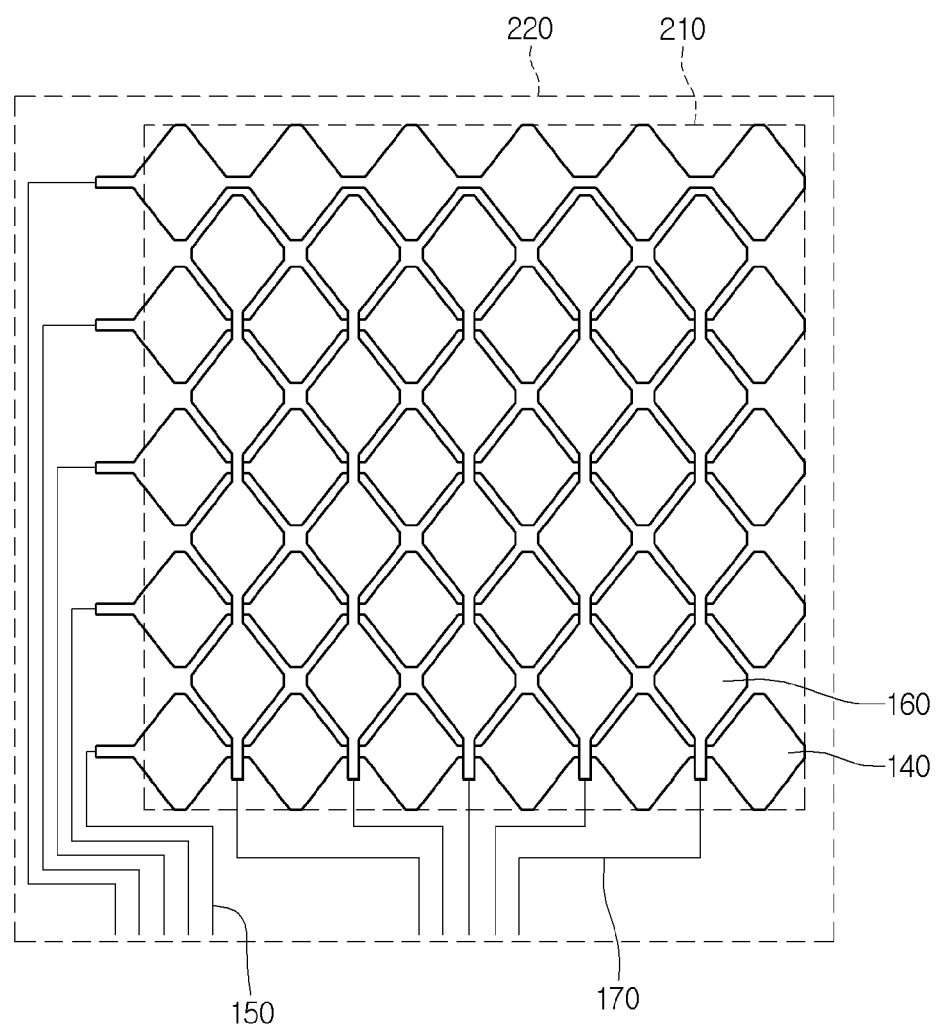
FIG. 4 is a top view of a touch panel which is manufactured through a process of FIG. 3.

FIG. 4 is a top view of a touch panel which is manufactured through the process of FIG. 3.

Referring to FIG. 4, the first and second metal electrodes 150 and 170 that are formed in the outer portion of the first insulation layer 210 on the transparent substrate 110 are illustrated. This is because the first and second conductive patterns 140 and 160 are formed and then the first and second metal electrodes 150 and 170 are simultaneously formed, in a manufacturing process.

Figure 5:
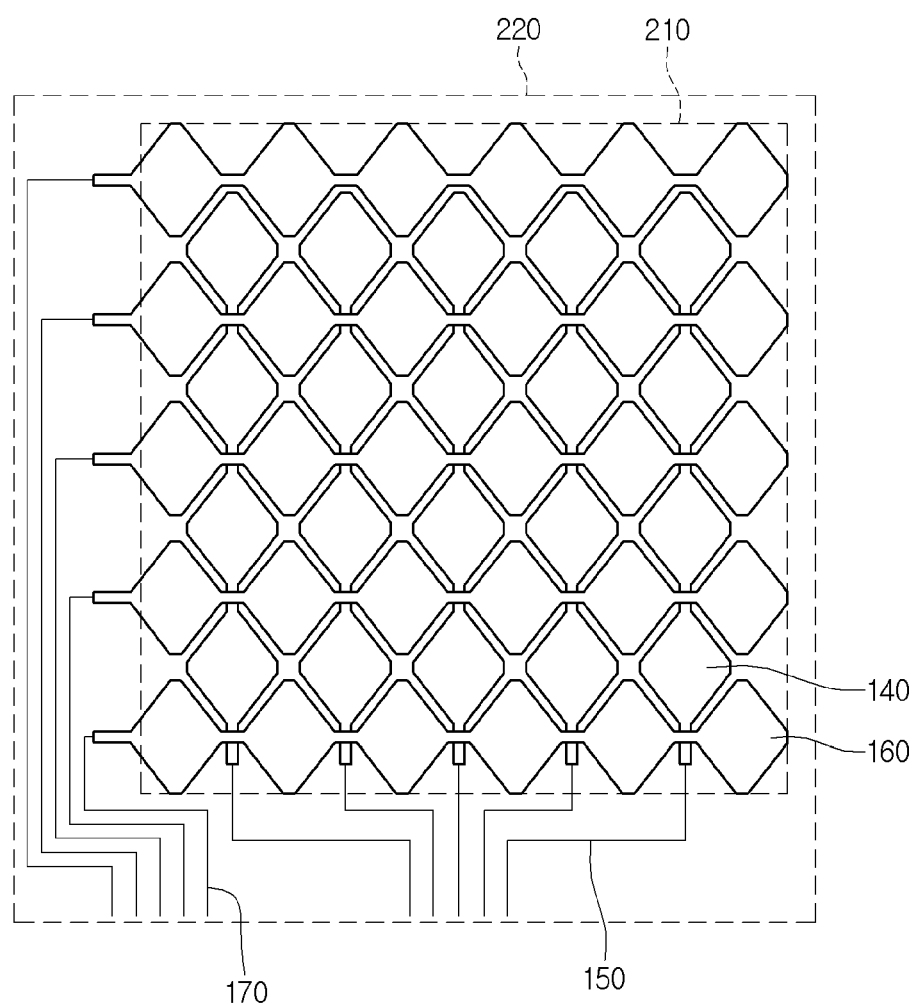
FIG. 5 is a top view illustrating a touch panel which is manufactured by switching positions of first and second conductive patterns of FIG. 4.

FIG. 5 is a top view illustrating a touch panel which is manufactured by switching the positions of the first and second conductive patterns of FIG. 4. That is, as described above, the width and the length are relative according to perspectives. Therefore, as illustrated in FIG. 5, the first conductive pattern 140 is connected along the length, and the second conductive pattern 160 is connected along the width.

Figure 6:
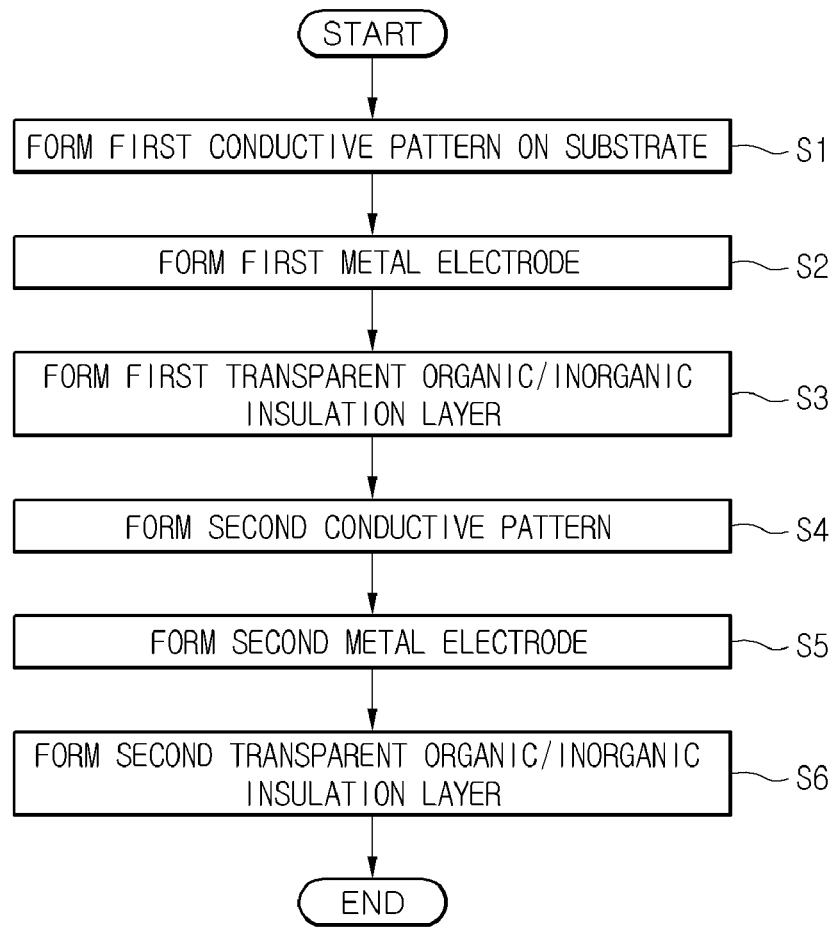
FIG. 6 is a flowchart illustrating a method of manufacturing touch panel according to another embodiment.

FIG. 6 is a flowchart illustrating a method of manufacturing touch panel according to another embodiment.

Referring to FIG. 6, first, a first conductive pattern is formed on a transparent substrate like FIG. 3 in operation S1. A first metal electrode connected to the one end of the first conductive pattern is formed on the transparent substrate in operation S2. Herein, since the first conductive pattern and the first metal electrode are formed on the same plane, unlike the illustrated, the first metal electrode may be formed, and then the first conductive pattern may be formed. Also, the first conductive pattern and the first metal electrode may be simultaneously formed of the same material.

Subsequently, a first insulation layer is formed in operation S3. Herein, the first insulation layer covers the first conductive pattern, and covers the transparent substrate to secure a space equal to a portion that is occupied by the second metal electrode to be formed after.

Afterward, a second conductive pattern is formed on the first insulation layer in operation S4. The second metal electrode is formed on the first insulation layer in operation S5. Herein, since the second conductive pattern and the second metal electrode are formed on the same plane, unlike the illustrated, the second metal electrode may be formed, and then the second conductive pattern may be formed.

Operations S4 and S5 may be performed at the same time. That is, a metal corresponding to the shape of the second conductive pattern and the shape of the second metal electrode is coated, a resist is coated, and after performing an etching process, by removing the resist, the second conductive pattern and the second metal electrode may be simultaneously formed of the same material.

Finally, a second insulation layer covering the first metal electrode, the second metal electrode and the second conductive pattern is formed in operation S6.

The process includes operation S1 of forming the first conductive pattern, operation S2 of the first metal electrode, operation S4 of forming the second conductive pattern, and operation S5 of forming the second metal electrode. As described above with reference to FIG. 3, the conductive transparent layer or the metal is coated, the resist is coated, and an etching and removing process is performed.

Figure 7:
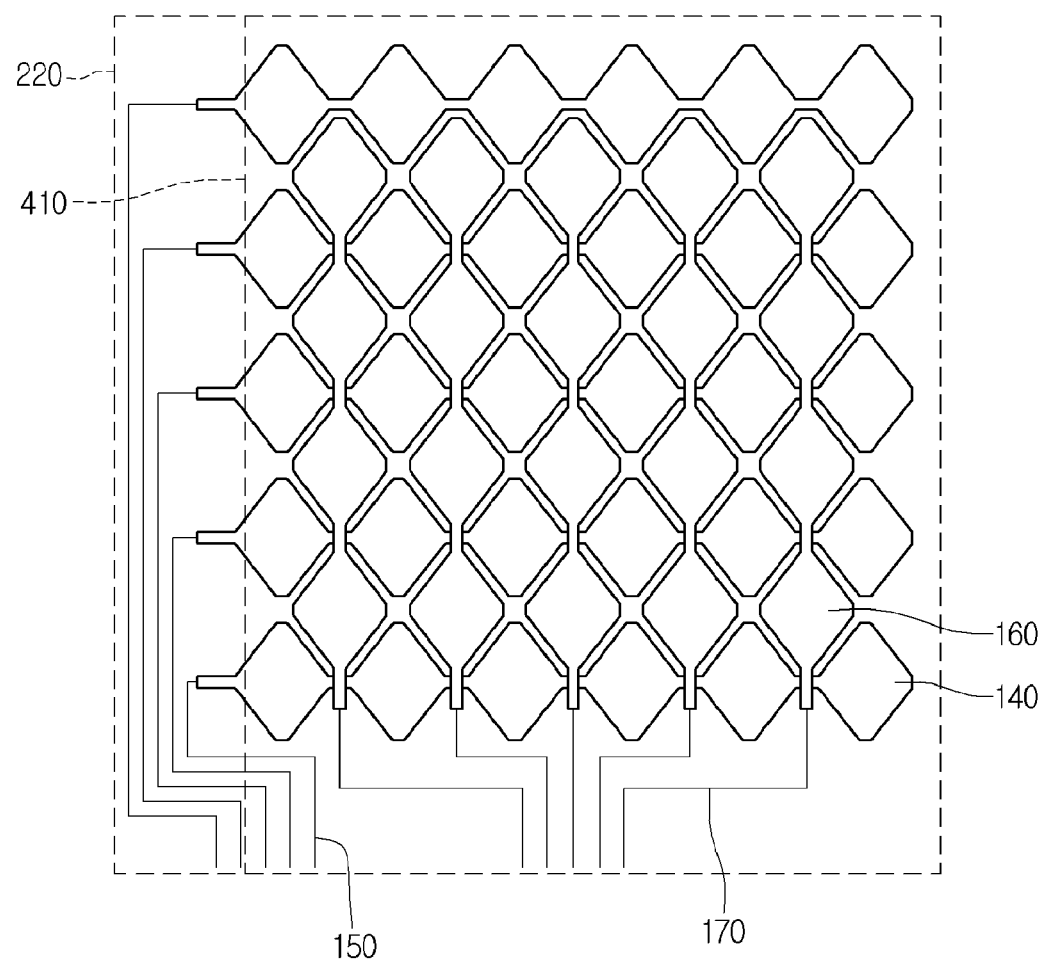
FIG. 7 is a top view of a touch panel which is manufactured through a process of FIG. 6.

FIG. 7 is a top view of a touch panel which is manufactured through the process of FIG. 6.

Referring to FIG. 7, the first metal electrode 150 is formed on the transparent substrate 110, and the second metal electrode 170 is formed on the first insulation layer 210.

According to embodiments, the touch panel does not use the OCA, and thus decreases an entire panel thickness and prevents OCA residual from occurring, thereby improving transmittance and visibility.

Any reference in this specification to one embodiment, an embodiment, example embodiment, etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch panel, comprising:
a first conductive pattern directly on and in direct physical contact with a transparent substrate;
a first insulation layer on the first conductive pattern;
a second conductive pattern on the first insulation layer;
a plurality of first metal electrodes directly on and in direct physical contact with the transparent substrate and connected to the first conductive pattern; and
a second metal electrode on the transparent substrate and connected to the second conductive pattern;
wherein the second conductive pattern is disposed in a spaced portion of the first conductive pattern,
wherein the first metal electrodes and the second metal electrode are formed on a same plane of the transparent substrate,
wherein the first insulation layer covers a portion of the transparent substrate where the first conductive pattern is disposed,
wherein an entire surface of the second conductive pattern is in direct physical contact with the first insulation layer;
wherein the first conductive pattern, the second conductive pattern, the first metal electrodes, and the second metal electrode all comprise the same material;
wherein a first connection area of the first conductive pattern and the first metal electrodes is disposed outside the first insulation layer, and
wherein a second connection area of the second conductive pattern and the second metal electrode is disposed inside the first insulation layer.

2. The touch panel according to claim 1, wherein one of the first and second metal electrodes is formed outside the first insulation layer.

3. The touch panel according to claim 1, wherein the first and second conductive patterns are extended in a mutually intersecting direction.

4. The touch panel according to claim 1, wherein the first metal electrodes and the second metal electrode are formed outside the first insulation layer on a same plane.

5. The touch panel according to claim 1, wherein the second conductive pattern is disposed directly on the first insulation layer.

6. The touch panel according to claim 1, wherein the first insulation layer is disposed on the first conductive pattern and the transparent substrate, and
wherein the first metal electrodes and the second metal electrode are disposed on the transparent substrate outside an outer edge of the first insulation layer.

7. The touch panel according to claim 1, comprising a plurality of second metal electrodes connected to the second conductive pattern, wherein all first metal electrodes and all second metal electrodes are formed on a same plane.

8. The touch panel according to claim 1, further comprising a second insulation layer on the second conductive pattern.

9. The touch panel according to claim 8, wherein the first insulation layer is a transparent organic or inorganic insulation layer, and wherein the second insulation layer is a transparent organic or inorganic insulation layer.

\* \* \* \* \*